Dec. 4, 1923.
F. STEBLER
FRUIT HANDLING APPARATUS
Filed Sept. 5, 1922
1,476,113
2 Sheets-Sheet 1
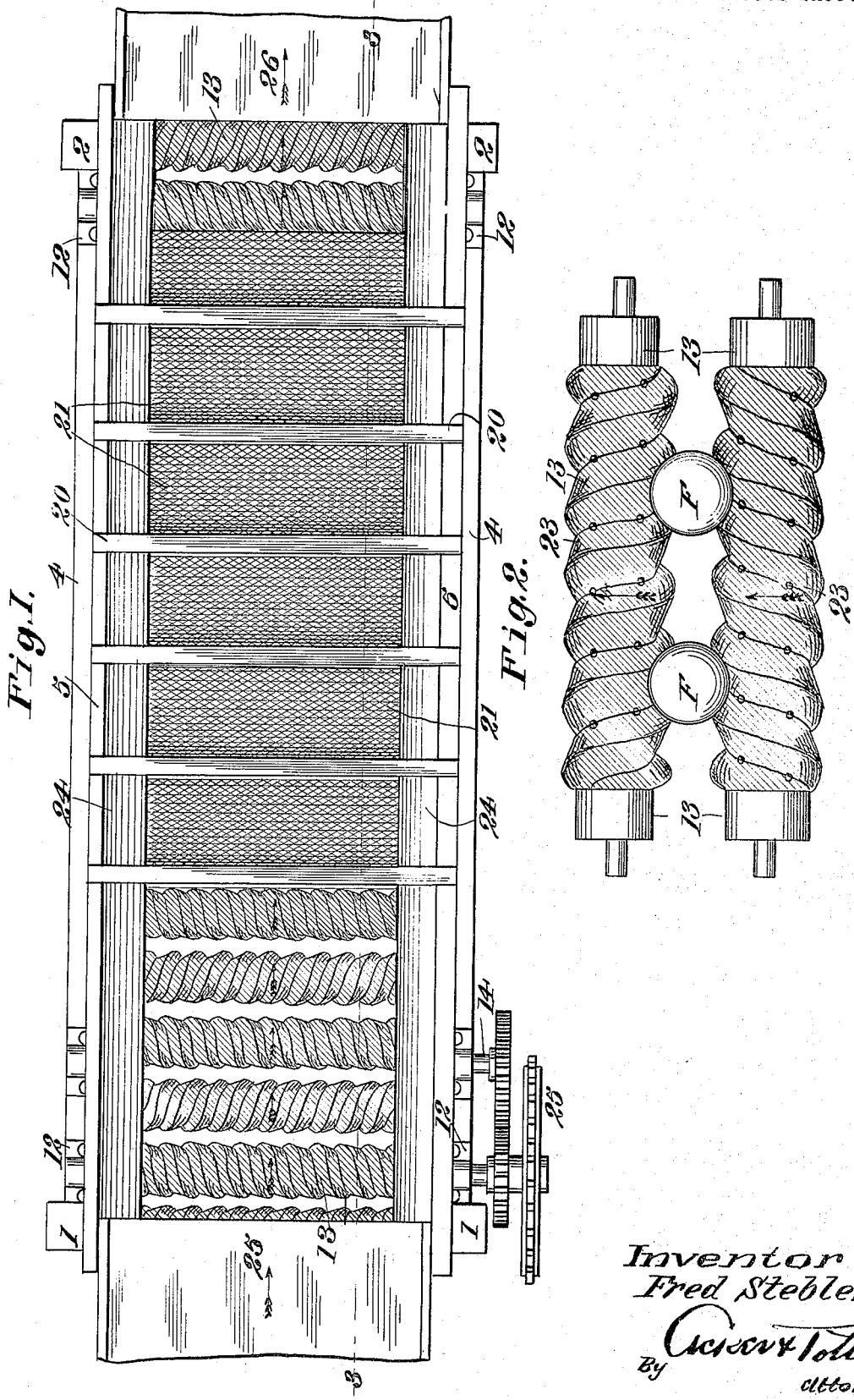
Inventor
Fred Stebler,
By ⟨signature⟩
Attorneys Dec. 4, 1923.
F. STEBLER
FRUIT HANDLING APPARATUS
Filed Sept. 5, 1922
1,476,113
2 Sheets-Sheet 2
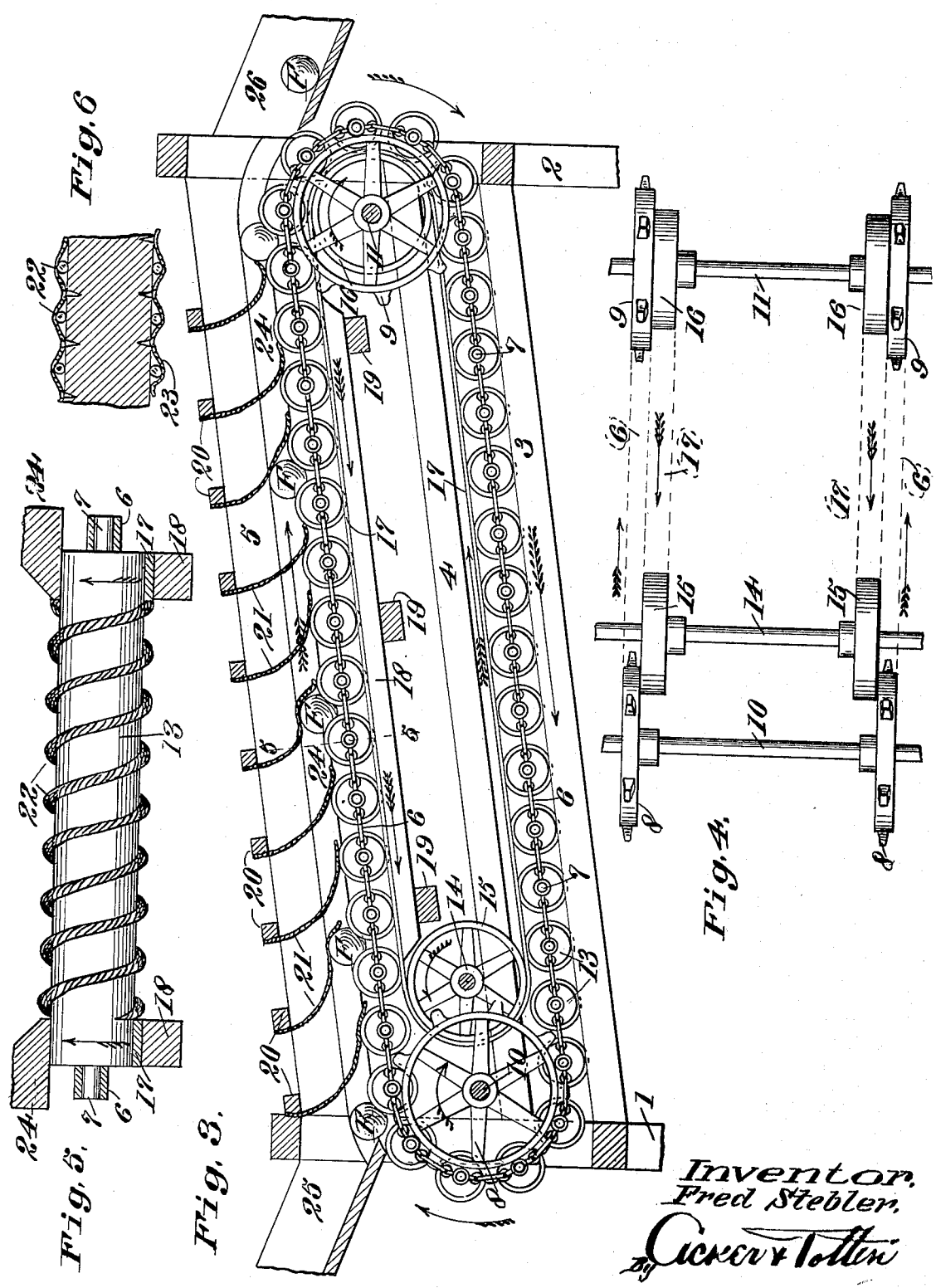

Patented Dec. 4, 1923.

1,476,113

UNITED STATES PATENT OFFICE.

FRED STEBLER, OF RIVERSIDE, CALIFORNIA, ASSIGNOR TO STEBLER PARKER CO., OF RIVERSIDE, CALIFORNIA, A CORPORATION OF CALIFORNIA.

FRUIT-HANDLING APPARATUS.

Application filed September 5, 1922. Serial No. 586,166.

*To all whom it may concern:*

Be it known that I, FRED STEBLER, a citizen of the United States, residing at Riverside, in the county of Riverside and State of California, have invented certain new and useful Improvements in Fruit-Handling Apparatus, of which the following is a specification.

This invention relates to machines for handling and cleaning fruit, wherein means are provided for automatically conveying the fruit through the machine in contact with cleaning devices.

A principal object of the invention is the provision of soft yielding means for contacting with the exterior of the fruit as it is moved through the machine whereby it is effectively cleaned and wiped.

In most fruit cleaning machines of my acquaintance, bristle brushes of various kinds are utilized to clean the skin of the fruit, through a scrubbing action imparted by quite a high rotative speed given the cylindrical brushes.

On some fruit this brushing action is undesirable and inclined to be detrimental, and is especially objectionable where apples are cleaned.

The design and arrangement of the operative elements of my improved fruit cleaning apparatus are such that the most delicate skinned fruits may be subjected to its action without the slightest danger of damage to the skin coatings of the fruit.

The capacity of my improved cleaning machine is fully equal to any of the brush type of cleaning machines, yet the action is so well controlled and modulated, and all contacts with the delicate skinned fruits, so cushioned and softly yieldable that they are delivered from the machine perfectly cleaned and with the skins uninjured in any manner.

With such objects in view, as well as other advantages, which may be incident to the use of the improvements, the invention consists in the procedure, and in the parts and combinations thereof hereinafter set forth and claimed, with the understanding that the several necessary elements constituting the invention may be varied in proportions and arrangement without departing from the nature of the invention.

In order to make the invention more clearly understood, there are shown in the accompanying drawings means for carrying the same into practical effect, without limiting the improvements in their useful applications, to the particular constructions, which, for the purpose of explanation, have been made the subject of illustration.

In the drawings accompanying this specification like reference numerals indicate like parts of the several views.

Figure 1 of the drawings is a plan of the machine showing two different planes. Part of the view shows the flexible wiping members arranged over the spirally wound conveyor rolls, while the other part illustrates the rolls.

Figure 2 is an enlarged plan of two of the spirally wound and covered conveyor rolls with two fruits thereon showing their relation while moving through the machine.

Figure 3 is a side sectional elevation on line 3—3 of Figure 1, showing in detail the general arrangement of the main working parts of the machine.

Figure 4 is a skeleton view showing in plan the sprockets and pulleys forming the driving elements of the machine.

Figure 5 is a lateral sectional elevation on line 5—5 of Figure 3 showing in detail the manner of mounting and rotating the conveyor rolls.

Figure 6 is a lateral sectional elevation of one of the conveyor rolls showing the manner of forming the spiral groove on each roll.

The numerals 1 and 2 represent standards at opposite ends of the machine, forming the main supports thereof, 3, 4, and 5 represent longitudinal frame members secured to the end supports 1 and 2, acting as spacers and tying the end supports and thereby forming a rigid framework for carrying all of the operative parts of the machine.

The principal operating element in the machine is the specially constructed conveyor for carrying the fruit through the machine and subjecting it to the action of the cleaning devices. This conveyor I have designated generally by the numeral 6. It is made up of specially constructed chain elements carrying spaced bearing links 7, arranged to operate in parallel relation on opposite sides of the machine. These two chains are carried on sprockets 8 and 9, on opposite sides of the machine and they in turn are carried by cross shafts 10 and 11, mounted to rotate in suitable bearings 12 on the frame members 4. Spirally wound conveyor rolls 13 are mounted to rotate in the bearing links 7 of the chains 6. These chains are continuous and are moved in the direction of the arrows at opposite ends of the machine in Figure 3.

The cross shaft 11 and an auxiliary shaft 14, carry suitable pulleys 15 and 16, which in turn carry a belt 17, that in turn rides over and is supported by the member 18, Figure 3.

This belt 17 is moved in the opposite direction to that of the chains 6 carrying the rolls 13, and as the ends of the rolls 13 rest on the belt during their movement through the machine, they are thereby given a higher rotative speed on their axes than if they merely rolled over a stationary support, as is usually the case.

The member 18 is supported by cross bars 19.

By reference to Figures 4 and 5 it will be seen that the belts 17 are narrow and contact with the ends of the rolls 13, only.

Arranged over the top of the machine and secured to the frame members 5, are a series of cross bars 20, these bars 20 carry pendent felt wipers 21, which normally rest on the advancing rolls 13. Figure 3 illustrates several fruit F passing through the machine and the wipers 21 lying in contact therewith, showing the manner in which they act to clean the fruit as it is conveyed through the machine.

Figures 2 and 5 illustrate in detail how the rolls 13 are made up. A small diameter rope 22 similar to a sash cord is first wound on the rolls, spirally as indicated in Figure 5, after which the roll and rope is covered with sheet felt 23, the felt being tacked down between the spiral turns of the rope as is shown in Figures 2 and 6. This produces a conveyor roll that is very soft and yielding and that will have practically no tendency to injure a delicate skinned fruit. Figure 1 also shows these rolls as they appear in their normal position in the machine when attached to the conveyor chains 6.

It will also be noted by reference to Figure 1 that the spirals on the rolls are arranged in alternate directions, the purpose of which will be described in the operation of the machine.

By reference to Figure 5 it will be noted that inclined members 24 are arranged at the ends of the rolls 13, these members 24 extending from end to end of the machine and form suitable side walls to confine the fruit and keep it within the zone of action of the rolls 13.

Having described the various operating elements of the machine as I have illustrated them I will now proceed with a description of the operation of the machine.

Fruit is admitted to the conveyor by means of a feed chute 25 and is immediately engaged by a pair of rolls 13, between which it is carried as shown in Figures 2 and 3, the rotation of the rolls causing the fruit to roll over and over at the same time it is being conveyed through the machine. The fruit immediately passes under one of the pendent felt wipers and is given a partial cleaning, and as it is conveyed forward it engages each wiper in turn until it is completely cleaned and ejected onto chute 26.

The belts 17 moving in the opposite direction over the members 18, than the direction of forward movement of the rolls 13, and the rolls 13 riding over these oppositely moving belts are thereby given a higher rotative speed on their individual axes, than if they simply rolled along a stationary support. This increased rotation given the rolls 13 results in rolling the fruit over and over, oftener, during its travel through the machine, than would otherwise occur, and the fruit is thereby rubbed and cleaned more vigorously by the combined action of the pendent cleaners 21 and the frictional action of the spiral grooved rolls 13. The belt covered rolls 13 have considerable of a cleaning action on the fruit, due somewhat to the slippage of the fruit along the felted grooves caused partly by the retarding action of the pendent wipers resting on the upper surfaces of the fruit; and further by the slightly variable surface speeds of the rolls themselves.

The manner of making these rolls as has been described, by a combination of spirally wound rope and sheet felt tacked over the rope, precludes the probability of getting all rolls of a mathematically accurate diameter, thus each roll will have surfaces of varying speeds as well as each pair of rolls. This condition is desirable and more or less intentional, because it is through the rubbing action of the variable speed surfaces combined with the action of the pendent wipers 21 that produces the maximum and highly satisfactory cleaning effect obtained by the use of this machine. The fruit thus conveyed and acted upon by the cleaning elements is given a two direction movement during its trip through the machine. A longitudinal direction by the forward conveying movement of the combined conveyor comprising all of the rolls 13, and a more or less constant rotative movement due to the axial rotation of each of the rolls 13.

The machine is driven through the sprocket 25, Fig. 1 from any suitable power source, not shown, and may be arranged in any well known manner to have a variable speed applied, so as to accommodate any differing size fruit but more particularly where extremely dirty fruit is encountered to produce an increased cleaning effect, by increasing the rotative speeds of the individual rolls 13 and thereby increase the frictional rubbing of the fruit, by the rolls.

The inventive ideas herein set forth may receive other embodiments than those which are specifically illustrated and described.

From the foregoing, it will be apparent that inasmuch as transversely disposed parallel conveyor rollers are utilized in the construction of the apparatus, adjacent rollers being alternately spirally wound, i. e. one roller being spirally wound in one direction and the adjacent opposing roller spirally wound in the opposite direction, that the tendency of one roller to move the fruit laterally across the machine is counterbalanced by the opposing or alternate spirally wound roller, whereby instead of moving the fruit laterally of the conveyor the same is rotated in a direction at right angles to that of the friction of the rollers themselves. By placing the spirals of adjacent rollers in the manner set forth, the tendency of the rollers to move the fruit laterally across the machine is immediately stopped. By thus arresting the lateral movement of the fruit while in rotation, by the action of one of the rollers being counteracted by the opposing tendency of the adjacent roller, a new motion is set up due to the opposing action of adjacent rollers, that is to say, one of the rollers acting on one side of the fruit tending to move it in one direction and the action of the adjacent roller on the opposite side of the fruit tending to move it the other way, with the result that the lateral travel of the fruit is not only broken up, but the tendency of the fruit to rotate on its seat between the rollers on a fixed axis is also broken up, inasmuch as by the opposing action of adjacent spiral rollers there can remain no fixed axis for the fruit to rotate on, as the axis of rotation of the fruit is constantly changed, one way by the roll of the rollers themselves and the other way by the action of the opposing spirals of adjacent rollers.

By reason of the constant changing of the axis of the fruit during the rotary movement thereof, there is produced or results the desirable effect of causing all surface of the fruit at one time or another during its longitudinal movement through the apparatus to come in contact with the rollers, and thus be cleaned over its entire surface by frictional contact. If the axis of the fruit remained a fixed one, and especially so where oblong fruit is under treatment, only a given portion of the surface thereof, and that the largest diameter of the fruit would be cleaned, because the surface at its smallest diameter would not have contact with the rollers. This is overcome in my apparatus by alternating the pitch of the spirals of adjacent rollers of the series of conveyor rollers, which is an important feature of the invention.

What I claim is:—

1. A machine for conveying and cleaning fruit comprising an inclined conveyor composed of spiral surfaced rolls, fixed position cleaning devices arranged adjacent said conveyor rolls for cleaning fruit on said conveyor, a track on which said rolls travel and movable in a direction opposite to that of the conveyor whereby said rolls are given added rotative speed, whereby said fruit is given a multiplicity of changing positions.

2. A machine for conveying and cleaning fruit comprising a movable conveyor composed of a series of rotatably mounted rolls, cleaning devices arranged adjacent said rolls for cleaning fruit, a movable track on which said rolls travel and by means of which they are given added rotation whereby said fruit is given a multiplicity of changing positions.

3. A machine for operating on globular shaped articles comprising conveyor means for moving said articles in a longitudinal and rotary direction simultaneously, fixed location devices for operating on said articles while being conveyed in said two directions, and other movable means for accelerating the rotary movement of said articles.

4. A machine for the cleaning of fruit, the same comprising a conveyor consisting of a series of transversely disposed endless traveling rollers, adjacent rollers of the series being provided with alternating spiral surfaces, longitudinally movable conveyor means with respect to which the rollers are rotatably mounted in spaced relation, a series of wiping means arranged above the rollers and adapted for contact with the fruit carried by said rollers, means movable in a direction opposite to that of the conveyor for imparting rotary motion to the rollers during the travel thereof, the fruit as advanced longitudinally by the rollers is given a rolling action during the passage thereof through the machine.

5. In a machine for the described purpose, the combination with an endless conveyor bed composed of a series of transversely disposed rollers, adjacent rollers of which being provided with alternating spiral surfaces, means coacting with the rollers for imparting longitudinal travel thereto and means co-operating with the rollers and movable in a direction opposite to their direction of travel for imparting high speed rotary motion thereto.

In testimony whereof I have signed my name to this specification.

FRED STEBLER.